(12) United States Patent  (10) Patent No.: US 7,560,680 B2
Sato et al.  (45) Date of Patent: Jul. 14, 2009

(54) 3D MEASUREMENT SENSOR

(75) Inventors: Yukio Sato, Tokyo (JP); Susumu Shibata, Nagoya (JP)

(73) Assignees: Japan Science and Technology Agency (JP); Spacevision, Inc. (JP)

( * ) Notice: Subject to any disclaimer, the term of this patent is extended or adjusted under 35 U.S.C. 154(b) by 271 days.

(21) Appl. No.: 11/665,417

(22) PCT Filed: Oct. 13, 2005

(86) PCT No.: PCT/JP2005/018889

§ 371 (c)(1),
(2), (4) Date: Apr. 13, 2007

(87) PCT Pub. No.: WO2006/041140

PCT Pub. Date: Apr. 20, 2006

(65) Prior Publication Data

US 2009/0045326 A1   Feb. 19, 2009

(30) Foreign Application Priority Data

Oct. 15, 2004   (JP) .............................. 2004-302215

(51) Int. Cl.
 *H01L 27/00*   (2006.01)
 *H01J 40/14*   (2006.01)
(52) U.S. Cl. ............................... 250/208.1; 250/214 R; 250/559.05; 356/606
(58) Field of Classification Search .............. 250/208.1, 250/214 R, 559.05, 559.07, 559.19, 559.26; 356/602, 606, 625, 636
See application file for complete search history.

(56) References Cited

U.S. PATENT DOCUMENTS 6,323,942 B1   11/2001 Bamji (Continued)

FOREIGN PATENT DOCUMENTS

JP   6-25653   4/1994

(Continued)

OTHER PUBLICATIONS

Seiji Iguchi and Kosuke Sato, "Three-Dimensional Image Measurement," 1st ed., Shokodo, Nov. 20, 1990, p. 36-40 (2.2.2 Slit Light Projection Method), and a Concise Explanation of Relevance thereof.

(Continued)

*Primary Examiner*—Kevin Pyo
(74) *Attorney, Agent, or Firm*—Cantor Colburn LLP (57) ABSTRACT

In a matrix of light detectors forming a part of a three-dimensional measurement sensor, outputs of light detectors belonging to a same row are connected to a common signal line. An output of each light detector is read, through scanning by the horizontal scan circuit, to the signal line from left to right in order, during a horizontal scan period which is sufficiently short such that slit light of a light-sectioning method can be assumed to be substantially stationary. A position detector determines a time from start of the horizontal scan period until detection of a maximum peak of a signal in the signal line. The time indicates a distance from an end of the row from which scanning is started to the light detector detecting the peak of the slit light. A recording processor records a value of a distance determined by the position detector in correspondence to a value of a counter indicating a projection angle of the slit angle.

9 Claims, 8 Drawing Sheets

U.S. PATENT DOCUMENTS

2002/0011552 A1* 1/2002 Sugiyama et al. ........ 250/208.1

FOREIGN PATENT DOCUMENTS

| JP | 11-160050 | 6/1999 |
|---|---|---|
| JP | 2001-53261 | 2/2001 |
| JP | 2002-365022 | 12/2002 |
| JP | 2002-366930 | 12/2002 |

OTHER PUBLICATIONS

Toshinobu Sugiyama et al., "A Color Imaging and Real-time 3-D Sensing CMOS Sensor," ITE Technical Report, vol. 26, No. 26, pp. 1-6, and an excerpt English translation thereof.

* cited by examiner

3D MEASUREMENT SENSOR

CROSS REFERENCE TO RELATED APPLICATIONS

This is a U.S. national stage of application No. PCT/JP2005/018889, filed on 13 Oct. 2005. Priority under 35 U.S.C. §119(a) and 35 U.S.C. §365(b) is claimed from Japanese Application No. 2004-302215, filed 15 Oct. 2004, the disclosure of which is also incorporated herein by reference.

TECHNICAL FIELD

The present invention relates to a sensor for measuring the three-dimensional shape of a target.

BACKGROUND ART

Shape measurement of a three-dimensional object using an optical system is becoming more popular in various industrial fields. Of these methods, a light-sectioning method is known and is considered to be a highly practical method. In a light-sectioning method, reflection light from a target surface when slit-shaped or spot-shaped light is irradiated on the target is captured by a camera, and a three-dimensional coordinate of each point on the surface of the target is determined from a positional relationship between a light source and the camera, through triangulation.

As a device for measuring three-dimensional shape through a light-sectioning method, there is known a device, for example, described in Non-Patent Document 1 (in particular, refer to "3.2.3 Image Encoder"). In this device, an image formed when slit light is swept over the target is captured by a CCD camera, and a video signal output by the camera is input to an image encoder. In addition to the video signal, a coding signal indicating a projection angle of the slit light is input to the image encoder. The image encoder applies a peak-holding process of brightness for each pixel in real time with respect to the input video signal, and, at the same time, detects a timing when each pixel is at the maximum brightness as determined by the peak-holding process, stores the coding signal at the detected timing as a coding value of the pixel, and forms a coding image to which the light-sectioning method can be applied.

The device of Non-Patent Document 1, however, assumes that the projection position of the slit light remains substantially unchanged during one reading and scanning period of the CCD camera. For the shape measurement of an object, the reading and scanning process must be repeated while the position of the slit light is changed gradually. Because a reading and scanning period of a typical CCD camera is $\frac{1}{30}$ seconds or $\frac{1}{60}$ seconds, three-dimensional shape measurement of a target by this device requires a long period of time, and, thus, the device substantially cannot be applied to a moving object.

In consideration of such a disadvantage, one of the present inventors proposed a device described in Patent Document 1. This device comprises a non-scanning image-capturing element having an element memory for each light detector. Each element memory is connected to a bus for transferring a time elapse signal t. A light reception output which is output when the light detector detects the slit light is supplied to the element memory as a trigger, and the element memory latches a value of the time elapse signal t supplied from the bus at that point of time. With such a configuration, when the slit light is swept once with respect to the target, information corresponding to time during which the slit light is incident on the corresponding light detector is stored in each element memory of the image-capturing element. In other words, in this device, information similar to the coding image generated by the image encoder of Non-Patent Document 1 is stored with respect to the element memories of the image-capturing element during one sweep of the slit light. Therefore, it is sufficient to perform a read and scan process of the memories of the image-capturing element once for each sweep of the slit light. In this manner, according to the device of Patent Document 1, the shape can be measured even when the slit light is swept at a speed similar to that of the read and scan process of the image-capturing element, and, thus, the shape can be measured almost in real time.

In the device of Patent Document 1, however, because an element memory must be provided for each light detector of the image-capturing element, there are disadvantages such as, for example, the size of the image-capturing element is increased and manufacture becomes complicated.

Non-Patent Document 2 describes a related art technique which takes another approach for handling the above-described disadvantage. In this reference, the real-time capability is enhanced through high-speed reading of the image-capturing element. A CMOS sensor that is used has, in addition to a light detector array, an analog memory array which can store signals of 4 frames for each pixel (a pixel in a 4-color light detector), and a comparator and an output latch provided for each column of the memory array. In this sensor, a signal of each pixel is read at a high frame rate of 3.3 kfps (kilo-frames per second), and the read signal is stored in a cell of a corresponding frame of the analog memory array. For the pixels of each column of the array, a difference signal is sequentially determined by subtracting, using the comparator for the column, a sum of two frames which are earlier in time from a sum of two frames which are later in time among the signals of four frames stored in the analog memory array, and a value of "0" is stored in the output latch when the difference signal is 0 and a value of "1" is stored in the output latch when the difference signal changes from a negative value to 0 (this is the timing when the peak of the slit light is on the pixel). By reading the output latch of each column at a high speed, it is possible to determine whether or not the peak of the slit light is incident on the pixel for each frame (one read and scan period of the light detector array). A frame number corresponds to a projection angle of the slit light, and, because it is possible to determine, by means of the sensor, the frame of each pixel at which the slit light peak is detected, the three-dimensional shape of the target can be determined.

The sensor of Non-Patent Document 2 can achieve an improvement in the aperture ratio of the light detector array by providing the circuit structures such as the analog memory array, the comparator, and the output latch outside of the light detector array. However, because an analog signal memory of 4 frames must be provided for each pixel, there is a disadvantage that the circuit of the element is increased in scale. Even if 4 frames per pixel is only exemplary, because a principle of determining a peak of slit light by a temporal difference in the light reception signal of the same pixel is employed, an analog signal memory of at least 2 frames must be provided for each pixel.

Patent Document 2 discloses, as an image-capturing element for three-dimensional measurement, a structure in which a plurality of pixels are arranged two-dimensionally, each pixel has an elongated shape along the sweep direction on the image-capturing surface of the slit light, and pixels adjacent along a direction perpendicular to the sweep direction are shifted from each other along the sweep direction. This reference also discloses a method in which output values of adjacent pixels are compared, a spatial position on the image-capturing element with the difference inverted is stored, and the pixel on which the slit light is incident is identified (refer to paragraphs 7 and 26).

However, Patent Document 2 fails to disclose a specific hardware circuit structure for realizing the method.

Patent Document 3 discloses, as a device for determining a three-dimensional shape of a target, a device in which a zero$^{th}$ order moment and a first order moment at each position along a direction of extension of pattern light in a direction perpendicular to the direction of extension of the light are determined by means of a zero$^{th}$ order moment calculator and a first order moment calculator, by integrating digital signals corresponding to output signals obtained at approximately the same time in the light-receiving element. In this device, an opto-electric output of each light-receiving element of the light detector array is converted to a multi-value digital signal, and a moment calculation process is applied to the digital signal.

The device of Patent Document 3 requires a complex circuit structure for various processes such as analog-to-digital conversion of the opto-electric output of each light-receiving element and parallel reading of obtained digital values, and, thus, the manufacturing cost of the device of Patent Document 3 is high.

Non-Patent Document 1: Toru Yoshizawa, "Three-Dimensional Engineering 1—Optical Three-Dimensional Measurement", 1st Ed., Shingijutsu Communications Inc., March, 1993, p. 38-51.

Non-Patent Document 2: Toshinobu Sugiyama, and three others, "A Color Imaging and Real-time 3-D Sensing CMOS sensor", ITE Technical Report, The Institute of Image Information and Television Engineers, Mar. 18, 2002, Vol. 26, No. 26, pp. 1-6.

Patent Document 1: JP 6-025653 B
Patent Document 2: JP 2001-053261 A
Patent Document 3: JP 2002-365022 A

DISCLOSURE OF INVENTION

An advantage of the present invention is provision of a sensor which can collect data to be used for measurement of the three-dimensional shape of a target with a relatively simple circuit structure.

According to one aspect of the present invention, there is provided a three-dimensional measurement sensor which obtains information for calculation of a three-dimensional shape through a light-sectioning method, the sensor comprising a light detector array in which light detectors are placed in a matrix form; a row signal line which is provided for each row of the light detector array and which is connected to an output of each light detector belonging to a corresponding row; a row scan circuit which selects light detectors of the light detector array in units of columns, causes output of an output signal of each selected light detector to a corresponding row signal line, and sequentially switches a column to be selected from one end of the row to another end of the row during a row scan period which is sufficiently short such that an image of slit light which is scanned for the light-sectioning method on the light detector array can be assumed to be substantially stationary; a light reception position detector circuit which is provided for each row signal line, detects, for each row scan period, a peak of a signal flowing through a corresponding row signal line in the row scan period, and determines information of a light reception position on the row of the light detector array in the row scan period on the basis of a timing of detection of the peak; and an output circuit which outputs the information of the light reception position determined by each light reception position detector circuit for each row scan period.

Here, the selection of the light detector in "units of columns" by the row scan circuit is not limited to one column at a time, and a plurality of consecutive columns may be selected simultaneously.

According to another aspect of the present invention, preferably, in the three-dimensional measurement sensor, each light reception position detector circuit comprises a peak-holding circuit which holds a peak level of a signal on a corresponding one of the row signal lines, a differentiating circuit which differentiates an output of the peak-holding circuit, an integrating circuit which integrates a predetermined reference signal, and a control element which causes discharging of charges stored in the integrating circuit when an output of the differentiating circuit assumes an ON level and causes storage of charges in the integrating circuit when the output of the differentiating circuit is at the OFF level, wherein the output circuit outputs an output of the integrating circuit upon completion of the row scan period as the information of the light reception position.

According to another aspect of the present invention, preferably, in the three-dimensional measurement sensor, the light reception position detector circuit comprises a peak-holding circuit which holds a peak level of a signal on a corresponding one of the row signal lines, a differentiating circuit which differentiates an output of the peak-holding circuit, a light reception position signal generation circuit which generates a light reception position signal having a signal level corresponding to an elapsed time from a start of a row scan period, and a sampling and holding circuit which is triggered by an output of the differentiating circuit and which samples and holds the light reception position signal at the time of the trigger, wherein the output circuit outputs a signal held by the sampling and holding circuit upon completion of the row scan period as the information of the light reception position.

According to another aspect of the present invention, preferably, the three-dimensional measurement sensor further comprises an angle counter which determines a projection angle of slit light with respect to a measurement target, and a storage processor which stores the information of the light reception position determined by each light reception position detector circuit in the row scan period and an output of the peak-holding circuit at the completion of the row scan period, in correspondence to a count value of the angle counter for the row scan period.

The three-dimensional measurement sensor according to this aspect of the present invention can provide a value of the angle counter and information of the light reception position as data forming a basis for calculation of three-dimensional coordinates based on the principles of trigonometry. In addition, by combining the information of the light reception position provided by the sensor and the output value of the peak-holding circuit, a brightness image indicating a brightness distribution of the measurement target can be formed.

BEST MODE FOR CARRYING OUT THE INVENTION

A preferred embodiment of the present invention will now be described by reference to the drawings.

First, a principle of three-dimensional shape measurement through the light-sectioning method to which a three-dimensional measurement sensor of the embodiment of the present invention is applied will be described by reference to FIG. 1.

Figure 1:
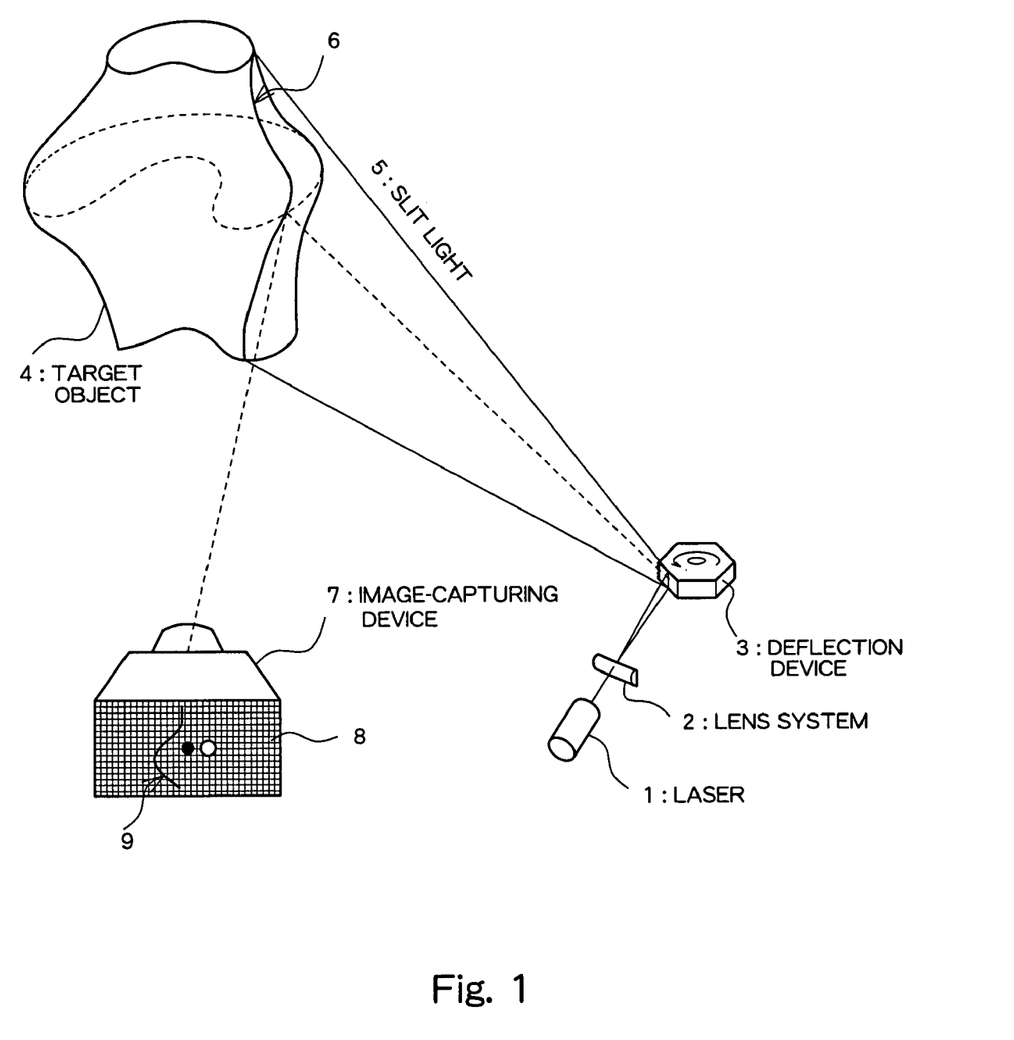
FIG. 1 is a diagram for explaining a principle of three-dimensional shape measurement by a light-sectioning method.

As shown in FIG. 1, in the light-sectioning method, slit light 5 is emitted from a light source comprising a laser 1, a lens system 2, etc.; reflected by a deflection device 3 such as a polygon mirror; and projected on a target object 4. In this manner, a surface of the target object 4 is illuminated in a slit shape. Reflection light from the surface of the target object 4 is focused by a lens system of an image-capturing device 7 and forms an image on an image-capturing surface 8 of an image-capturing element. An image is formed on the image-capturing surface 8 in which only a slit-shaped portion 9 corresponding to a slit-shaped illuminated portion 6 on the surface of the target object 4 is bright and the other portions are dark. Here, a three-dimensional coordinate of a point on the illuminated portion 6 on the target object 4 can be determined through a principle of triangulation based on a two-dimensional position of a point on the slit-shaped portion 9 on the image-capturing surface 8 corresponding to the point, positions of the light source (laser 1) and the image-capturing surface 8, and a projection direction (angle) of the slit light 5 at that point of time. By rotating a reflection surface of the deflection device 3, the surface of the target object 4 is scanned with the slit light 5 from one end to the other end. In principle, because all points on the surface of the target object 4 (excluding a portion which becomes a shadow due to the structure of the optical system) are illuminated only once by the slit light during one scan, the three-dimensional position of the points can be identified through the principle of triangulation as described above.

An overview of the light-sectioning method has been described. The principle of the light-sectioning method and the general system structure are known, as described in, for example, the above-described related art (in particular, Non-Patent Document 1) and Seiji Iguchi and Kosuke Sato, "Three-Dimensional Image Measurement", 1st ed., Shokodo, Nov. 20, 1990, p. 36-40 (2.2.2 Slit Light Projection Method), and will not be described here in detail.

In the present embodiment, a three-dimensional measurement sensor preferable for three-dimensional shape measurement through the light-sectioning method will be described. A measurement principle of the embodiment will now be described by reference to FIG. 2.

Figure 2:
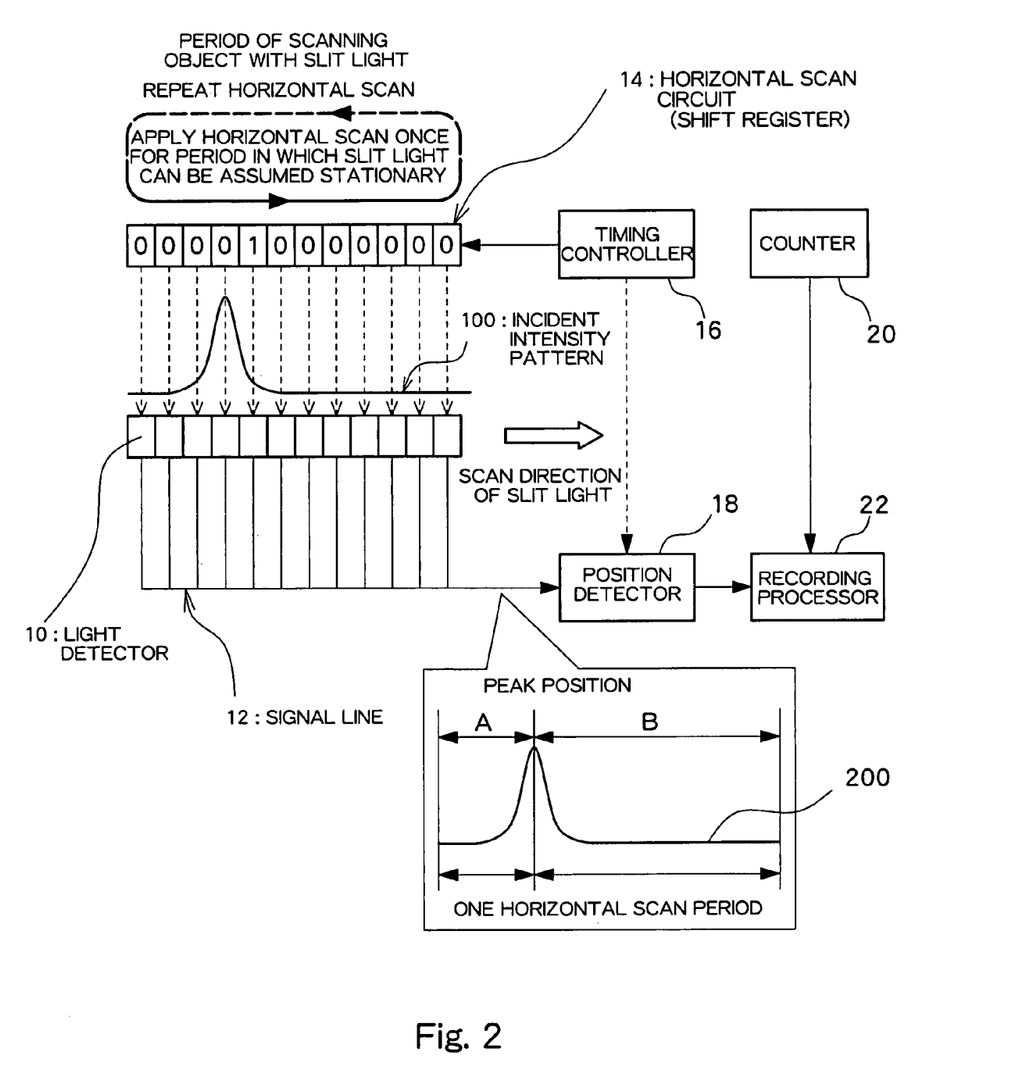
FIG. 2 is a diagram for explaining a measurement principle of a three-dimensional measurement sensor in an embodiment.

A device of the present embodiment generates data of the time of incidence of the slit light on a position of each pixel (light detector) on the image-capturing surface 8. The time of incidence of the slit light on the pixel corresponds to a projection angle of the slit light. Because the position of each pixel on the image-capturing surface 8 and the position of the light source are known, a three-dimensional coordinate of a point on the target object 4 corresponding to the pixel can be calculated once the time is known. This concept is similar to the concept of Patent Document 1. A disadvantage of the method of Patent Document 1 is that cost or the like is increased, because a circuit which detects incidence of the slit light and holds the time is provided for each pixel. Therefore, the present embodiment attempts to improve on this respect.

FIG. 2 schematically shows a row of a matrix (array) of light detectors 10 (for example, photodiodes) arranged on the image-capturing surface 8 of the image-capturing device 7. The light detectors 10 belonging to this row are connected to a common signal line 12, so that a detection signal generated upon the detection of light is output to the signal line 12.

Here, the direction of the row is assumed to be identical to the direction of scanning of the slit light in the light-sectioning method. That is, this configuration corresponds to a case where the image-capturing device 7 is placed in a manner such that the direction of the row is parallel to the slit light scanning direction. In this case, the image of the slit light on the image-capturing surface 8 crosses the rows of the matrix of the light detectors 10 of the image-capturing surface 8. The scanning direction of slit light described herein is a direction of movement of the slit light which forms an image on the image-capturing surface of the image-capturing device 7 in response to scanning of the slit light by the deflection device 3.

An intensity pattern of slit light incident at a certain instant with respect to the rows of the light detectors 10 is a pattern having one steep peak such as, for example, the incident intensity pattern 100 shown in the drawings, because one ray of slit light crosses the rows. Therefore, by reading and scanning rows in a period which is sufficiently short such that the slit light can be assumed to be stationary; that is, by scanning in a manner to sequentially read, to the signal line 12, the outputs of the light detectors 10 from one end of the row to the other end one at a time, an output signal 200 having one large peak as shown in the drawings will flow in the signal line 12 (strictly speaking, because the light detectors 10 for outputting the signal are sequentially switched, the output signal on the signal line 12 will not have a smooth shape as shown in the drawings, but the general tendency is shown in the drawings). The example signal shown in the drawings is an output signal 200 when the light detectors 10 are selected in order from left to right.

By measuring a time A from a start of one read and scan process (that is, horizontal scan (or row scan)) to the peak, or a time B from the peak to an end of one read and scan process, the position of the peak in one row can be determined.

The read and scan process of one row is performed by a horizontal scan circuit 14. The horizontal scan circuit 14 comprises, for example, a parallel output shift register. In this case, one of stages of the shift register is set at H (high) level ("1") and the other stages of the shift register are set at L (low) level ("0"), and the H level is shifted in order from one end to the other end according to a clock signal supplied from a timing controller 16. Switches which connect/disconnect the output of the corresponding light detectors 10 and the signal line 12 are opened and closed with an output of the stages. At the instant depicted in the drawings, because only the stage corresponding to a fifth light detector 10 from the left is at the high level, the output of the fifth light detector 10 (a signal having a low level close to 0) is output to the signal line 12.

By processing the signal in the signal line 12 by means of a position detector 18, a position of the peak of the incident light on the row at that point of time is determined. The peak position can be determined, for example, by counting, with a counter, a clock signal which serves as a reference for the shift operation of the horizontal scan circuit 14 and obtaining a count value of the counter at the timing of detection of the peak of the signal. By clearing the counter at every horizontal scan period, the counter value can indicate the time A from the start of the horizontal scan to the detection of the peak. The determination of the peak is not limited to this configuration, and other methods will be described later.

With the above-described configuration, the peak position of the incident light on the row is determined. A recording processor 22 records the peak position in correspondence to a count value of a counter 20 for determining the projection angle of the slit light. The counter 20 may, for example, increment the count value at each horizontal scan period of the horizontal scan circuit 14 and clear the count value every time the scan of the slit light is completed.

A structure of one row has been described. A pixel matrix (array) of the image-capturing surface 8 can be formed by arranging a plurality of such rows. In this case, one horizontal scan circuit 14, one timing controller 16, one counter 20, and one recording processor 22 can be provided for the plurality of rows.

In the above description, a process in one horizontal scan period has been described. By repeating the above-described process for the scan period of the slit light, there can be determined data of the time of incidence of the slit light with respect to each pixel position during the slit light scan. In this manner, base data necessary for calculation of the three-dimensional shape of the overall target object 4 can be collected.

In the above description, there has been described a configuration in which the direction of the rows of the pixel matrix is set parallel to the slit scan direction. Because, in principle, the data collection process can be executed so long as the image of the slit light crosses the rows of the matrix, the directions do not need to be parallel with one another, although a parallel configuration is the preferred configuration.

In addition, in the above description, only one light detector 10 simultaneously reads in one row. Alternatively, it is also possible to configure the device such that outputs of a plurality of adjacent light detectors 10 are read simultaneously, in order to, for example, improve the sensitivity.

Next, an example circuit structure of the three-dimensional measurement sensor according to the present embodiment will be described by reference to FIG. 3. Circuit elements corresponding to the constituent elements in the principal structure of FIG. 2 will be assigned the same reference numerals.

Figure 3:
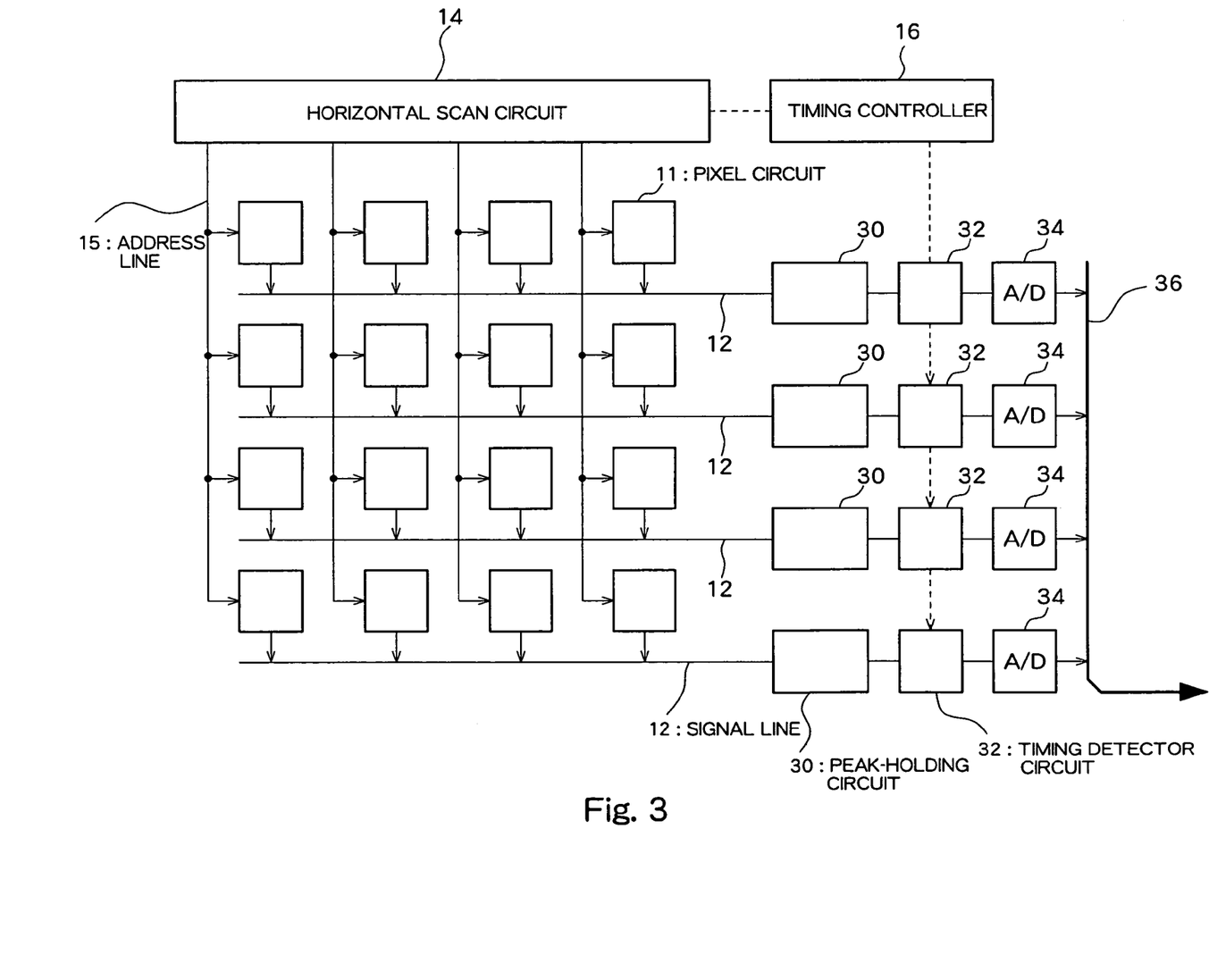
FIG. 3 is a diagram showing an example circuit structure of a three-dimensional measurement sensor in an embodiment.

In the circuit structure shown in FIG. 3, pixel circuits 11 are arranged in a matrix form. A plurality (4 in FIG. 3) of pixel circuits 11 belonging to the same row (horizontal line) are connected to a common signal line 12. Although not shown, the pixel circuit 11 comprises a light detector 10, and a switch for connecting/disconnecting between an output of the light detector 10 and the signal line 12. The switch is switched ON and OFF according to a control signal supplied from a horizontal scan circuit 14 through an address line 15. The switches of the plurality (4 in FIG. 3) of pixel circuits 11 belonging to the same column are connected to a common address line 15, and are simultaneously switched ON and OFF. The horizontal scan circuit 14 supplies an ON signal (for example, an H level signal) to only the address line 15 of one of the columns (or a predetermined number of consecutive columns) of the pixel circuits 11, and supplies an OFF signal (for example, an L level signal) to the other columns. The horizontal scan circuit 14 shifts the column to which the ON signal is to be supplied along one direction (for example, from right to left) one column by one column at a predetermined period based on a clock signal supplied from a timing controller 16. With such a shift operation, the columns are sequentially selected from one row end to the other row end of the matrix during one horizontal scan period. With such a horizontal scan, an output signal as exemplified in FIG. 2 showing a position of the intensity peak of the incident light in each row is output on the signal line 12 of each row.

Each signal line 12 is connected to a peak-holding circuit 30, and an output of the peak-holding circuit 30 is connected to an input of a timing detector circuit 32. The pair consisting of the peak-holding circuit 30 and the timing detector circuit 32 corresponds to the position detector 18 in the principal structure of FIG. 2.

The peak-holding circuit 30 holds and outputs a peak value of a signal input from the signal line 12. The output of each peak-holding circuit 30 is input to the corresponding timing detector circuit 32. The timing detector circuit 32 generates a peak timing signal based on the output of the peak-holding circuit 30, generates a distance signal based on the generated peak timing signal, and outputs the distance signal. The distance signal is a signal which indicates a distance from a pixel which is the brightest among the row of the pixels corresponding to the signal line 12 (that is, the pixel on which the slit light is incident) to one end of the row (in the example configuration, the right end).

Example circuit structures for the peak-holding circuit 30 and the timing detector circuit 32 will now be explained by reference to FIG. 4.

The peak-holding circuit 30 of the exemplified configuration is a typical peak-holding circuit comprising two voltage follower circuits for impedance conversion of input and output, and a capacitor C1 for holding a peak voltage. The signal line 12 is connected to a non-inverted input terminal of an operational amplifier OP1 forming a part of a first voltage follower circuit. An output terminal of the operational amplifier OP1 is connected to an anode of a rectifying diode D1. A cathode side of the diode D1 is connected to an inverted input terminal of the operational amplifier OP1, and, thus, the first voltage follower circuit is formed. The cathode side of the diode D1 is also connected to a non-inverted input terminal of an operational amplifier OP2 of a second voltage follower circuit. One terminal of the capacitor C1 for holding the peak voltage is connected to the non-inverted input terminal of the operational amplifier OP2 connected to a cathode side of the diode D1, and the other terminal of the capacitor C1 is connected to a ground terminal. An output terminal of the operational amplifier OP2 is connected to the non-inverted input terminal of the operational amplifier OP2 itself, so that the second voltage follower circuit is formed. An output from an output terminal of the operational amplifier OP2 is the output of the peak-holding circuit 30.

The timing detector circuit 32 comprises a differentiating circuit 322 and a distance signal generation circuit 324.

The differentiating circuit 322 is a typical differentiating circuit using an operational amplifier. One terminal of a capacitor C2 which forms a part of the differentiating circuit 322 is connected to the output of the peak-holding circuit 30, and the other terminal of the capacitor C2 is connected to an inverted input terminal of an operational amplifier OP3. A non-inverted input terminal of the operational amplifier OP3 is connected to the ground, and an output terminal of the operational amplifier OP3 is connected to the inverted input terminal of the operational amplifier OP3 itself. A signal in which the output signal of the peak-holding circuit 30 is differentiated is output from an output terminal of the operational amplifier OP3.

The distance signal generation circuit 324 comprises a transistor TR1, a capacitor C3, a resistor R1, and an operational amplifier OP4. The transistor TR1 in the exemplified circuit is of an NPN type, with a base connected to an output of the differentiating circuit 322; that is, the output terminal of the operational amplifier OP3, and an emitter connected to the ground. A collector of the transistor TR1 is connected to a non-inverted input terminal of the operational amplifier OP4. One end of the resistor R1 is connected to the non-inverted input terminal of the operational amplifier OP4 connected to the collector of the transistor TR1, and the other end of the resistor R1 is connected to a horizontal scan signal output terminal of the timing controller 16. A horizontal scan signal is a signal which indicates a horizontal scan period, and is a signal, for example, which assumes an H level during the horizontal scan period. In addition, one end of the capacitor C3, which stores charges according to the horizontal scan signal which is input via the resistor R1, is connected to the non-inverted input terminal of the operational amplifier OP4. The other end of the capacitor C3 is connected to the ground. An output terminal of the operational amplifier OP4 is connected to an inverted input terminal of the operational amplifier OP4 itself so that a voltage follower circuit is formed. An output signal from the output terminal of the operational amplifier OP4 is the distance signal indicating a distance from a peak position of the incident light in the row of pixels to an end of the row.

Next, operations of the peak-holding circuit 30 and the timing detecting circuit 32 will be explained by reference to a signal timing chart of FIG. 5.

Figure 5:
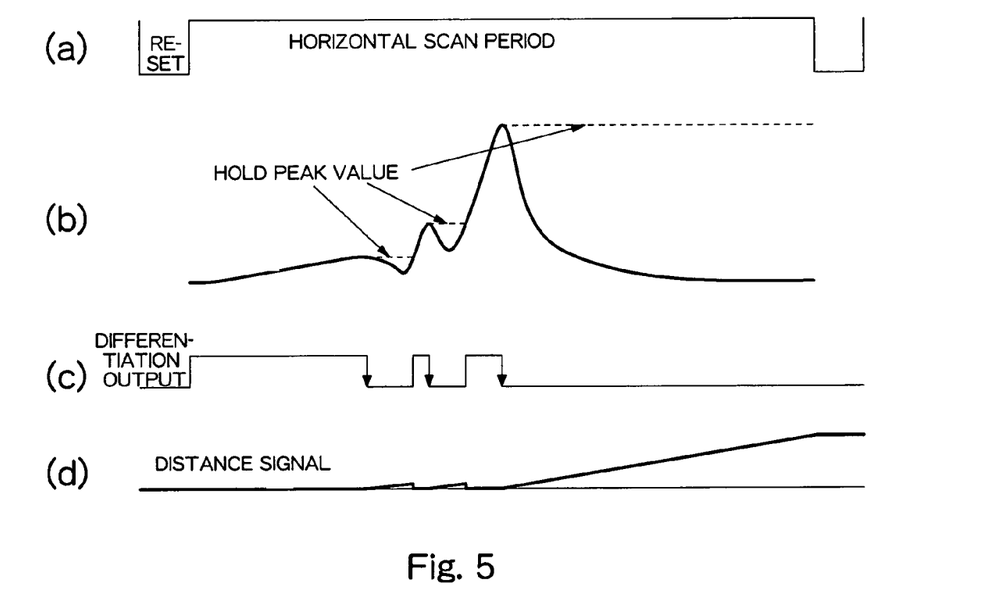
FIG. 5 is a diagram showing a timing chart of a signal at each section in the example circuit structure of FIG. 3.

Chart (a) shown in FIG. 5 is a timing chart of the horizontal scan signal supplied from the timing controller 16 to the distance signal generation circuit 324. The horizontal scan signal assumes an H level for the horizontal scan period of the sensor, and is then reset and assumes an L level until the next horizontal scan period starts.

Chart (b) shown in FIG. 5 is a timing chart of an input signal to the peak-holding circuit 30; that is, a signal on the signal line 21, and an output signal of the peak-holding circuit 30. Because the light detector 10 for outputting the light detection signal is sequentially switched by the horizontal scanning process, the input signal from the signal line 12 is a signal having several peaks as shown by a solid line in time chart (b), with a maximum peak occurring at a timing when a signal is output from a light detector 10 on which the peak of the incident light is incident. The output signal of the peak-holding circuit 30 is a signal shown by a dotted line (in the section in which the dotted line cannot be seen, the dotted line overlaps the solid line).

Chart (c) shown in FIG. 5 is a timing chart of an output signal of the differentiating circuit 322. This signal is a signal in which the peak holding output signal shown by the dotted line in chart (b) is differentiated. Thus, the signal assumes an L level during a period in which the peak value of the input signal from the signal line 12 is held and assumes an H level when the level of the input signal is increased from the held value. The level increases and decreases several times until the maximum peak of the input signal is reached, but once the maximum peak is reached, the signal continues to be at the L level until completion of the horizontal scan period.

Chart (d) shown in FIG. 5 is a timing chart of a distance signal output from the distance signal generation circuit 324. The distance signal is a signal having a level corresponding to charges stored in the capacitor C3 by the horizontal scan signal. Here, when the output signal of the differentiating circuit 322 (hereinafter referred to as "differentiation output") assumes an H level and the transistor TR1 is switched ON, the charges stored in the capacitor C3 are discharged to the ground through the transistor TR1. Therefore, every time the differentiation output assumes the H level, the level of the distance signal is reset to a minimum value (0). After the input signal from the signal line 12 reaches the maximum peak, however, the differentiation output never assumes the H level until the completion of the horizontal scan period, and, thus, charges are gradually stored in the capacitor C3 and the level of the distance signal is increased as time elapses. Therefore, upon completion of the horizontal scan period, there is output a distance signal having a level corresponding to the distance from the position of the light detector 10 on which the slit light is incident to the end position of the row (which corresponds to the time B in FIG. 2).

Returning to FIG. 3, the distance signal output from the timing detector circuit 32 is converted to digital data by an A/D converter 34. By using an A/D converter 34 having a number of bits with a resolution greater than or equal to the number of pixels on one row, for example, it is possible to convert the incident position of the slit light on the row to data which can be determined at a precision of the pixel unit or greater.

A latch (not shown) is provided at the rear of the A/D converter 34, and digital data indicating the distance signal are latched in the latch circuit at the timing of the completion of the horizontal scan period. In this manner, at the completion of the horizontal scan period, the latch at the end of each row stores digital data representing a magnitude of the distance signal indicating the peak position of the incident light on the corresponding row. The value of the latch is cleared at a start timing of the next horizontal scan period. In order to realize such an operation, for example, a horizontal scan signal is supplied from the timing controller 16 to the latch circuit, so that the output of the A/D converter 34 is latched at the timing of the fall of the horizontal scan signal and the latched data are cleared at the timing of the rise of the horizontal scan signal.

The recording processor 22 shown in FIG. 2 sequentially reads the data stored in the latch of each row via a data output line 36 after the completion of a horizontal scan period and before the start of the next horizontal scan period. For each latch of the row, a combination of the data obtained from the latch (which indicates the peak position; that is, the maximum brightness position, of the incident light in the row), the row number, and a count value of the counter 20 indicating the projection angle of the slit light at that point of time is stored in a predetermined storage device. By repeating this operation for the period of one scan of the slit light, data necessary for calculating the three-dimensional shape of the target object 4 can be gathered. Specifically, a pixel position (that is, the row and column of the pixel) corresponding to the combination of the row number of the row and the maximum brightness position of the row obtained for each horizontal scan period can be identified, and corresponding data of the count value can be used as the value of the pixel corresponding to the pixel position. In this manner, it is possible to create, for each pixel on the image-capturing surface, an image which indicates a count value (which is equivalent to the projection angle of the slit light) at which the pixel assumes the maximum brightness (hereinafter referred to as "projection angle image"). In processors which follow, the three-dimensional shape of the target object 4 can be calculated on the basis of the projection angle image and the known placement position information of the light source and the image-capturing device.

In the position detector 18 having the peak-holding circuit 30 and the timing detector circuit 32 explained by reference to FIG. 4, the output signal of the peak-holding circuit 30 may also be output and used as the brightness signal, in addition to being input to the timing detector circuit 32. In this case, after the brightness signal is converted to a digital value by the A/D converter (not shown), the signal is input to a latch circuit (not shown). In other words, in this case, similar to the A/D converter 34 and the latch circuit for the distance signal, an A/D converter and a latch circuit for the brightness signal are provided for each row. The latch circuit latches an output of the A/D converter at the timing of fall of the horizontal scan signal and is cleared at the timing of the next rise of the horizontal scan signal. The recording processor 22 sequentially reads the data stored in the latch circuit of each row (brightness value) during a period in which the horizontal scan signal is at the reset level (that is, a period from completion of the horizontal scan period to the start of the next horizontal scan period), and stores, in a predetermined storage device, the data in correspondence to a row number of the corresponding row and a count value of the counter 20. By repeating this operation for the scan period of the slit light, it is possible to obtain a maximum brightness value of each row at the timing of the count value for each count value of the counter 20.

Because the recording processor 22 stores data of the distance signal (that is, the peak position of the incident light) of each row corresponding to each count value of the counter 20, a position of the maximum brightness can be determined for each row at the timing corresponding to each count value. Therefore, for each timing of each counter value (that is, for each projection angle of the slit light) and for each row, a combination of the maximum brightness value and a position on the row having the maximum brightness value can be determined. Thus, by collecting the combination over the scan period of the slit light and mapping the combination on the pixels of each row and each column of the pixel matrix, it is possible to obtain an image comprising a maximum brightness of each pixel during that period (hereinafter referred to as a "brightness image"). This image is an image which is close to an image obtained when the target object 4 is illuminated with a normal light source (rather than the slit light).

In the above, it is explained that the data value of the distance signal and the data value of the brightness signal are individually recorded by the recording processor 22. Alternatively, it is also preferable to collectively record these data values corresponding to the count value of the counter 20.

An example configuration of a measurement device which uses a three-dimensional measurement sensor according to the present embodiment will next be described by reference to FIG. 6.

Figure 6:
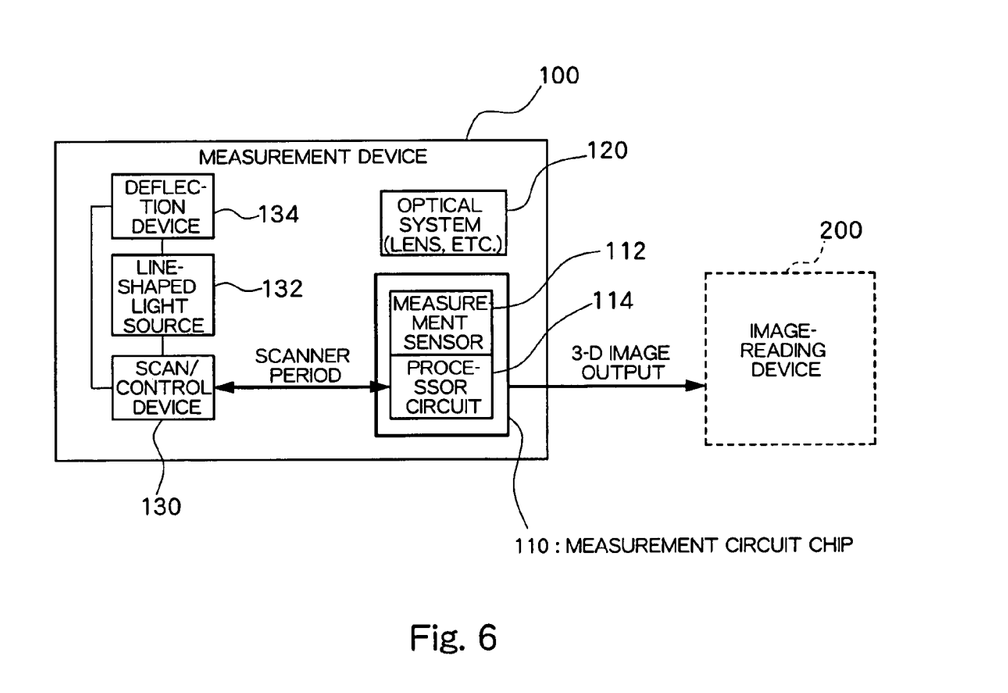
FIG. 6 is a diagram showing an example system configuration of a three-dimensional shape measurement device using a sensor of an embodiment.

In the example configuration of FIG. 6, a measurement device 100 comprises a measurement circuit chip 110, an optical system 120, a scan/control device 130, a line-shaped light source 132, and a deflection device 134. The optical system 120 is a system comprising optical components such as a lens, and focuses reflection light from a target object on an image-capturing surface of a measurement sensor 112. The measurement sensor 112 is a sensor having the circuits shown in FIG. 3; that is, the matrix of pixel circuits 11, the horizontal scan circuit 14, the peak-holding circuit 30, the timing detector circuit 32, the A/D converter 34, and the latch circuit. A processor circuit 114 is a circuit which performs functions of the timing controller 16, the counter 20, and the recording processor 22 in the structure of FIG. 2, and a function to control the operation of the slit light. The processor circuit 114 outputs the projection angle image as described above (and the brightness image when the brightness image is generated) to an image-reading device 200 at a rear stage.

Each of the measurement sensor 112 and the processor circuit 114 can be integrated on a respective chip. Alternatively, it is also possible to integrate the measurement sensor 112 and the processor circuit 114 on a single chip, to form a measurement circuit chip 100.

The scan/control device 130 is a circuit which controls scanning of the slit light. Based on various control signals such as the horizontal scan signal and the scan clock signal supplied from the processor circuit 114, the scan/control device 130 controls the line-shaped light source 132, which emits slit light to be switched ON and OFF, and controls a deflection angle of a mirror in the deflection device 134.

The image-reading device 200 obtains the projection angle image and/or the brightness image from the processor circuit 114, and calculates the three-dimensional shape of the target object 4 on the basis of the projection angle image. The image-reading device 200 can display, on an attached display device, the calculated three-dimensional shape or the brightness image, or store the calculated three-dimensional shape or the brightness image as a file.

A preferred embodiment of the present invention has been described. As described above, the three-dimensional measurement sensor according to the present embodiment can generate a projection angle image which is similar to those in the related art described in Patent Document 1 and Non-Patent Document 2, with a relatively small circuit scale. For example, whereas the circuit structure of Non-Patent Document 2 requires frame memories of four frames and a comparator circuit for each pixel, the circuit structure of the present embodiment only requires that the peak-holding circuit 30, the timing detector circuit 32, the A/D converter circuit 34, etc. be provided for each row of pixels. Thus, the circuit scale can be reduced as compared with Non-Patent Document 2.

Figure 4:
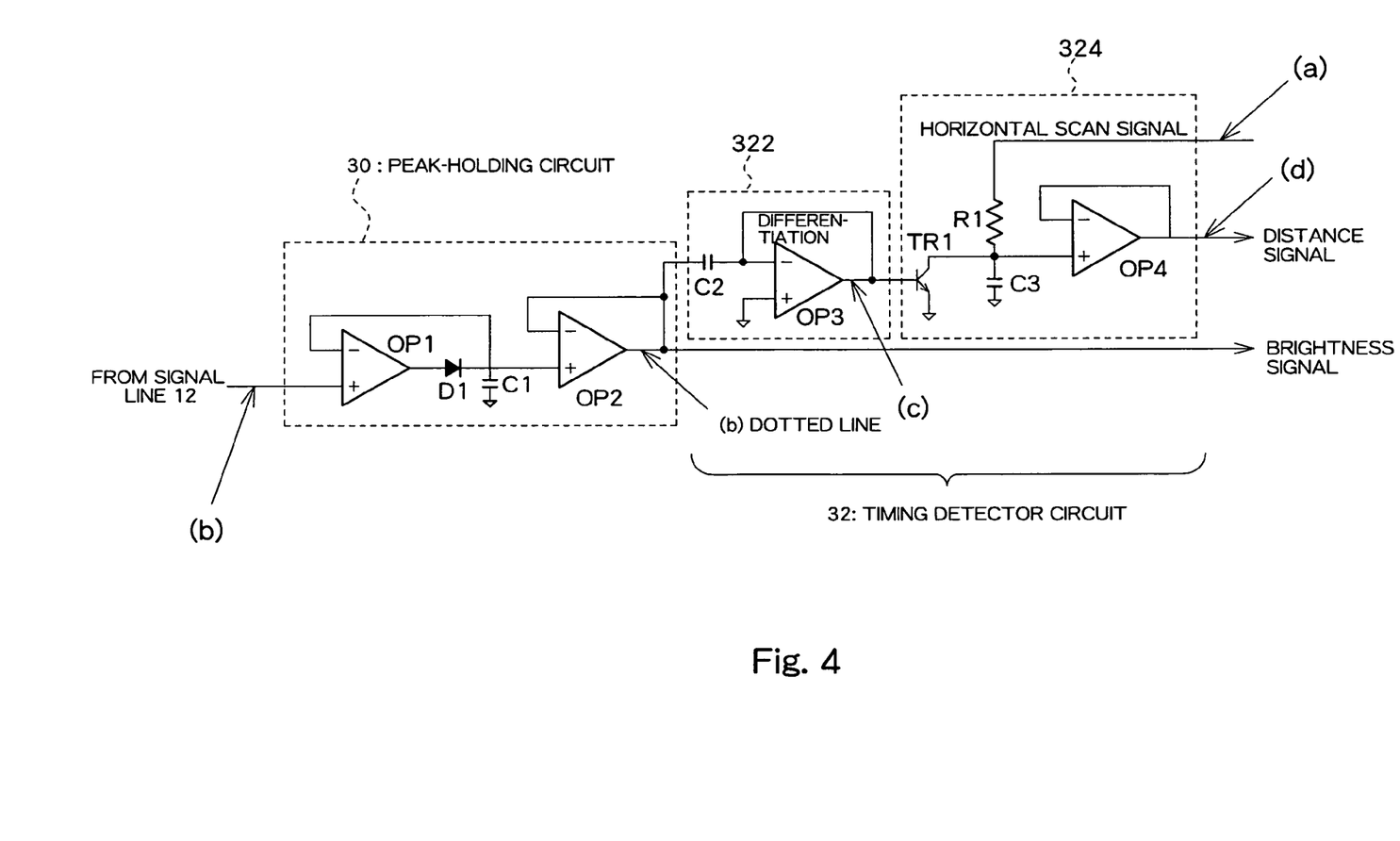
FIG. 4 is a diagram showing an example circuit structure of a peak-holding circuit and a timing detector circuit.

The circuit structure shown in FIGS. 3, 4, etc. is only exemplary, and various modifications are possible within the scope of the present invention.

For example, in the structure of FIGS. 3, 4, etc., a horizontal scan signal is integrated in order to generate the distance signal, but this is only exemplary. Alternatively, it is also possible to employ structures shown in FIGS. 7 and 8.

Figure 7:
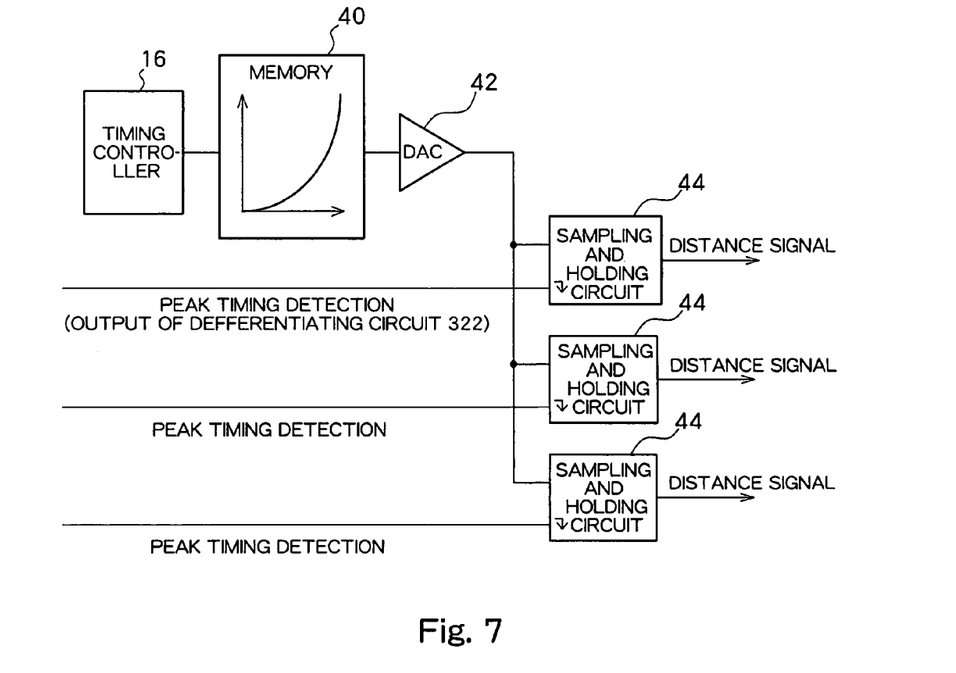
FIG. 7 is a diagram showing a primary portion of another example circuit structure of a three-dimensional measurement sensor.

In a structure of FIG. 7, waveform data equivalent to a time waveform of the distance signal generated by the distance signal generation circuit 324 of FIG. 4 is registered in a waveform memory 40. The waveform data to be registered are waveform data in which the counter value of the counter (that is, the elapsed time from the start of the horizontal scan period) for determining the peak position of the incident light within a horizontal scan period is plotted on the horizontal axis and a value of the distance signal which is output at the completion of the horizontal scan period when a maximum peak of the incident light is detected at the timing of the counter value for each of the counter values is plotted on the vertical axis.

Values of the distance signals registered in the waveform memory 40 are sequentially output according to the horizontal scan clock signal supplied from the timing controller 16. This value is converted into an analog signal by a D/A converter (DAC) 42 and is input to a sampling and holding circuit 44 of each row.

A peak timing detection signal; that is, an output signal of the differentiating circuit 322 in the structure of FIG. 4, is supplied to the sampling and holding circuit 44 as a control signal for controlling the sampling and holding operation. As shown in chart (c) of FIG. 5, the output of the differentiating circuit 322 has its level increased and decreased according to small peaks until the input signal from the signal line 12 reaches the maximum peak in the horizontal scan period, but maintains the L level until the completion of the horizontal scan period after the level falls from the H level to the L level at the time the maximum peak is reached. Therefore, by configuring the sampling and holding circuit 44 to hold the signal input from the D/A converter 42 at a fall of a square wave pulse, it is possible to output a distance signal, having the same magnitude as that of the distance signal from the distance signal generating circuit 324 of FIG. 4, from the sampling and holding circuit 44 at the completion of the horizontal scan period.

As described, the structure of FIG. 7 can be considered to be a structure in which the distance signal generation circuit 324 in the structure of FIGS. 3 and 4 is replaced with the waveform memory 40, the D/A converter 42, and the sampling and holding circuit 44. The structures after the sampling and holding circuit 44 are not shown in the drawing, in view that structures similar to those in FIGS. 3 and 4 may be employed. It should be apparent to a person with ordinary skill in the art that such a structure can execute processes similar to those in FIGS. 3 and 4.

In the structure of FIG. 7, the level value of the distance signal read from the waveform memory 40 is once converted to an analog signal and is then held by the sampling and holding circuit 44. In a structure of FIG. 8, on the other hand, the distance (that is, the peak position of the incident light) is processed as a digital value.

Figure 8:
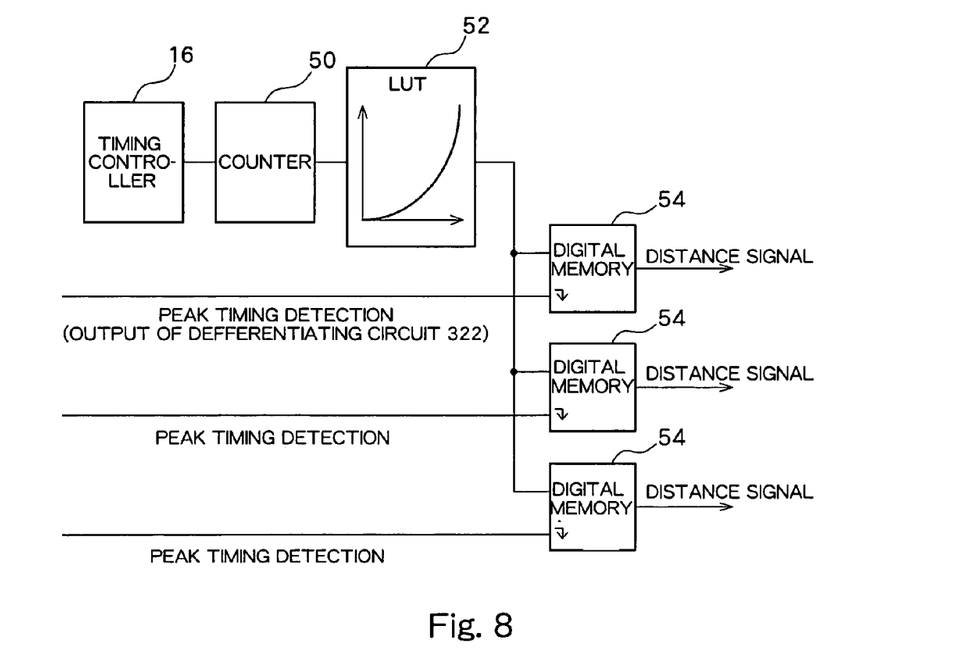
FIG. 8 is a diagram showing a primary portion of yet another example circuit structure of a three-dimensional measurement sensor.

In the structure of FIG. 8, in place of the distance signal generation circuit 324, the A/D converter 34, and the latch circuit (not shown) in the structure of FIGS. 3 and 4, a counter 50, a lookup table (LUT) 52, and a digital memory 54 are provided.

In the structure of FIG. 8, the counter 50 is reset at the start of the horizontal scan period, and counts the clock signal for horizontal scan which is supplied from the timing controller 16. A count value of the counter 50 represents a time period from the start of the horizontal scan period until the detection of the peak of the incident light. In principle, this period is proportional to the distance from an end of the row of the pixel matrix at the side from which scan is started to the position of the peak of the incident light in this row. Therefore, in principle, by latching the count value of the counter 50 in the digital memory 54 at the timing of the fall of the peak timing detection signal; that is, the output of the differentiating circuit 322, it is possible to store, in the digital memory 54, the count value which, in principle, indicates the peak position of the incident light on the row at the time of completion of the horizontal scan period, because the count value stored in the digital memory 54 does not change after the maximum peak, although the count value stored in the digital memory 54 may be updated due to increase/decrease of the differentiation output corresponding to small peaks until the maximum peak of the input signal from the signal line 12 is observed. Therefore, by reading the value stored in the digital memory 54 of each row at the time of completion of the horizontal scan period, it is possible to obtain information of the maximum brightness position of each row in the period.

However, the elapsed time from the start of the horizontal scan period until the detection of peak of the incident light is not necessarily proportional to the distance from the end of the row on the side from which scan is started to the peak position of the incident light. In addition, individual differences may exist among measurement sensors in terms of the relationship between the elapsed time and distance. In the example structure of FIG. 8, the LUT 52 is provided in order to compensate for the nonlinearity of the relationship between the elapsed time and distance and the individual differences. In the LUT 52, a value of "distance from the end of the row from which scan is started to the peak position of the incident light" corresponding to the count value of the counter 50 is registered. The LUT 52 outputs a value of distance corresponding to the count value which is input from the counter 50. The distance value is latched in the digital memory 54 at the timing of fall of the peak timing detection signal. More precise information of the peak position can be determined with the use of the LUT 52 in this manner.

It should be apparent to a person with ordinary skill in the art that processes similar to those of FIGS. 3 and 4 can be executed with such a configuration.

By using the LUT 52, the individual differences or the like can be corrected. In the structure of FIG. 7 also, a similar correction effect can be achieved by adjusting the waveform data to be registered in the waveform memory 40. In addition, in the sensor structure of FIGS. 3 and 4, similar correction can be achieved by, for example, providing a lookup table indicating a relationship between the value of the distance signal and the actual peak position, in the calculation device at the rear which applies the coordinate calculation based on trigonometry, and calculating the coordinate after correcting the data digitized by the A/D converter 34 in the calculation device.

Figure 9:
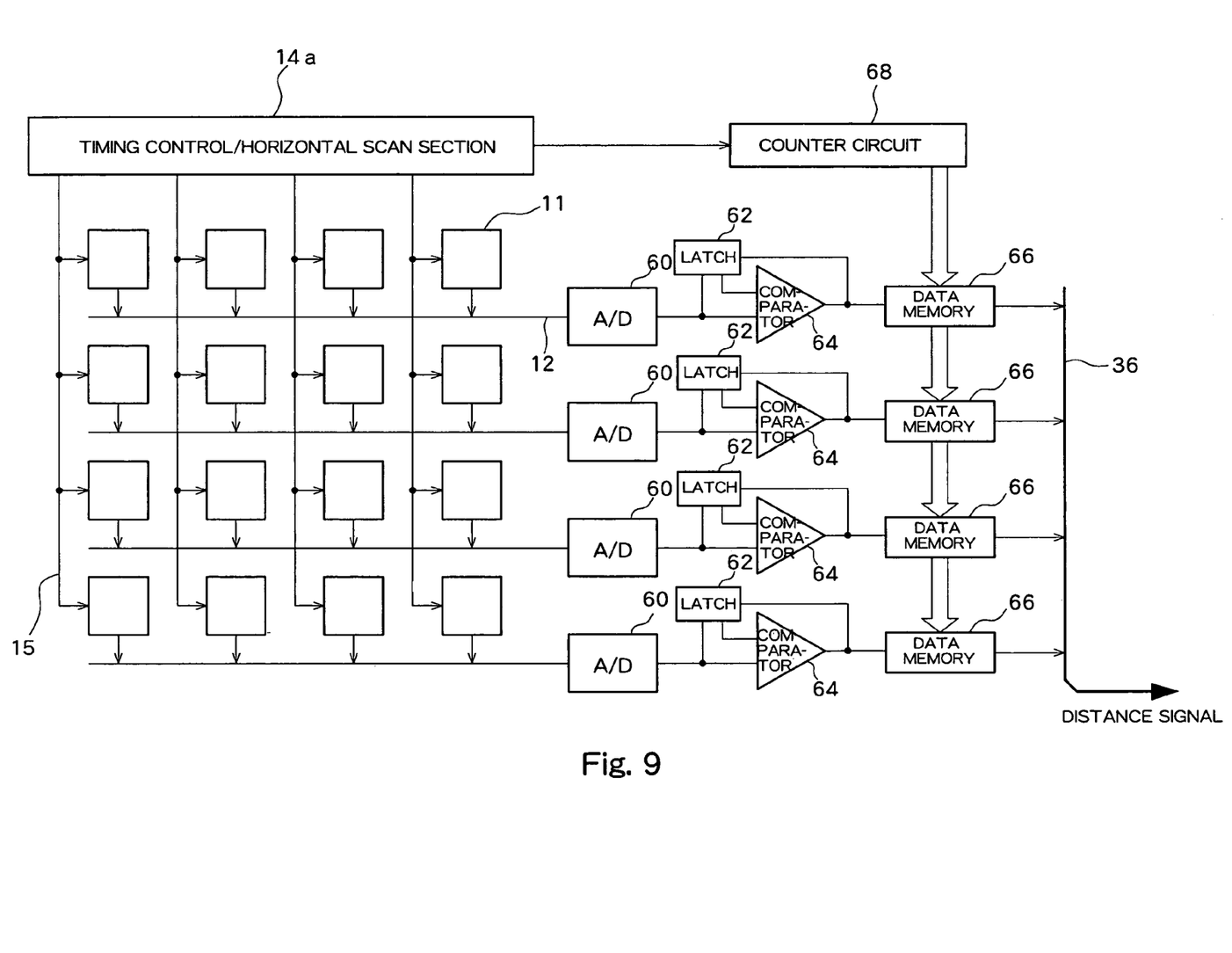
FIG. 9 is a diagram showing a primary portion of another example circuit structure of a three-dimensional measurement sensor.

FIG. 9 shows another example circuit structure. In FIG. 9, elements similar to those in FIG. 3 are assigned the same reference numerals and will not be described again.

In the circuit structure of FIG. 9, a timing control/horizontal scan section 14a is a unit incorporating the horizontal scan circuit 14 and the timing controller 16 in the circuit structure of FIG. 3, and is shown collectively in order to simplify the drawing.

The structure of FIG. 9 comprises an A/D converter 60, a data latch 62, a comparator 64, data memory 66, and a counter circuit 68, in place of the peak-holding circuit 30, the timing detector circuit 32, the A/D converter 34, and the data latch in the structure of FIG. 3. Of these, one each of the A/D converter 60, data latch 62, comparator 64, and the data memory 66 are provided for each signal line 12.

The A/D converter 60 samples a signal flowing in the signal line 12 at a predetermined sample timing, converts the sampled signal to a digital value, and outputs the digital value. An output of the A/D converter 60 is input to the comparator 64 and the data latch 62. The comparator 64 compares the output of the A/D converter 60 with a digital value supplied from the data latch 62. When a result of the comparison shows that the former is larger than the latter, an H level signal is output. When, on the other hand, the former is smaller than the latter, an L level signal is output. The data latch 62 latches the digital value supplied from the A/D converter 60 when the H level signal is input from the comparator 64, and maintains the digital value stored in the data latch 62 while the L level signal is input from the comparator 64. The data latch 62 is reset after the completion of one horizontal scan period before the start of the next horizontal scan period. With such an operation of the data latch 62, at a certain timing within the horizontal scan period, the data latch 62 maintains a maximum value of the signal flowing through the signal line 12 corresponding to the latch 62 until that timing (more strictly, until a timing before the sample timing immediately before that timing). Thus, the comparator 64 compares the maximum value stored in the data latch 62 and the value of the signal in the signal line 12 at the current sample timing. Therefore, a signal which is similar to the differentiation output of chart (c) in FIG. 5 is output from the comparator 64.

The counter circuit 68 counts the count value at a predetermined interval from the start of one horizontal scan period to the completion of the horizontal scan period. The counting interval of the count value is set to be a period shorter than the time interval in which the individual pixel circuit 11 on one line can be identified (that is, a period of a horizontal scan period divided by the number of pixels on one line). The count value of the counter circuit 68 is reset according to a timing signal input from the timing control/horizontal scan section 14a at a timing between the completion of one horizontal scan period and the start of the next horizontal scan period. Therefore, the count value output by the counter circuit 68 is a value which indicates a position along the horizontal direction on one line. The count value of the counter circuit 68 is supplied to the data memory corresponding to each signal line 12. The data memory 66 latches the count value at the timing of fall of the signal which is input from the comparator 64.

In such a circuit structure, at the completion of the horizontal scan period, each data memory 66 stores the count value corresponding to the incidence position of the slit light on the corresponding signal line 12. The processes which follow may be similar to those in the structure of FIG. 3.

With such a circuit structure also, information of the three-dimensional shape can be determined in a manner similar to that of the structures of FIGS. 3, 7, and 8.

Figure 10:
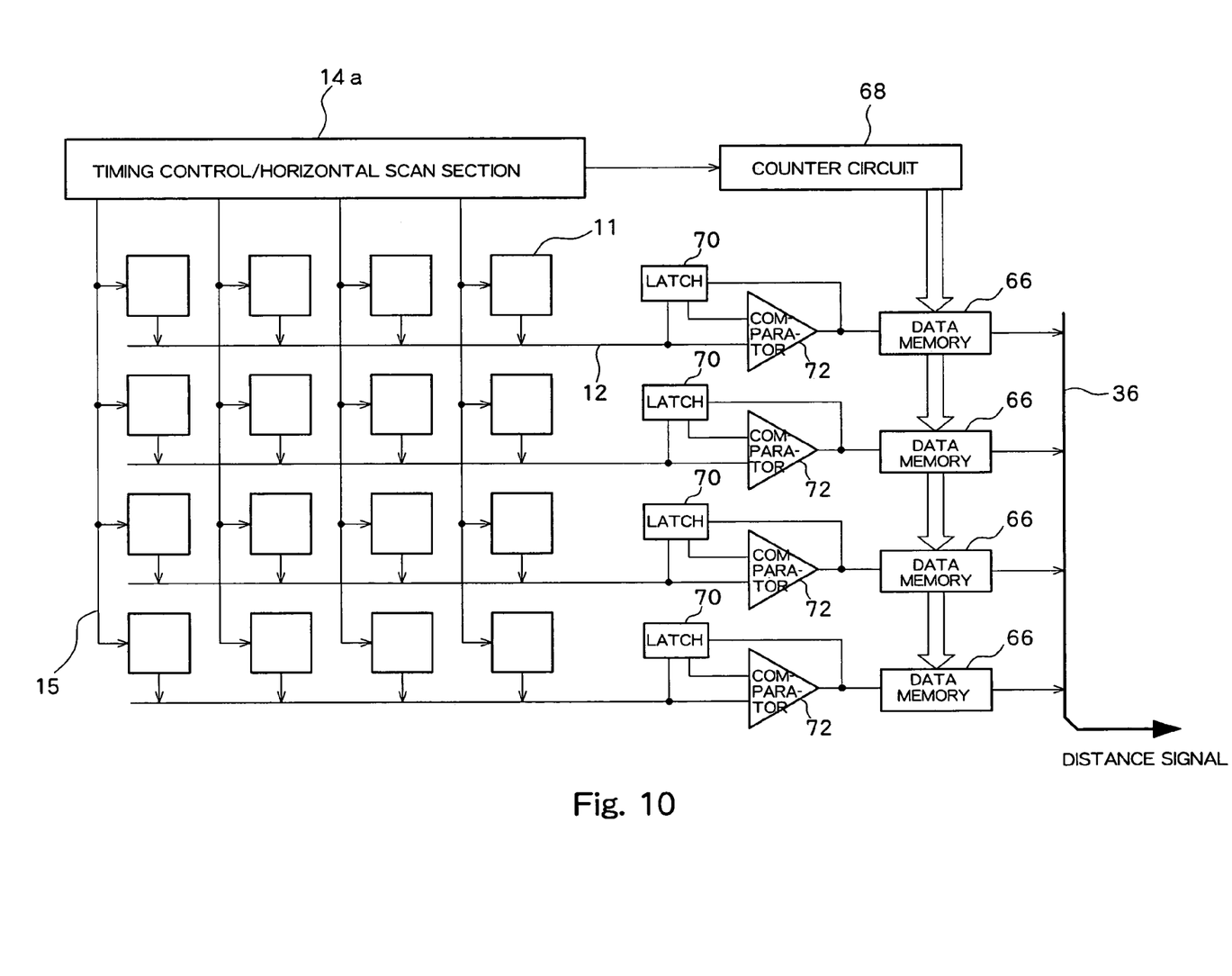
FIG. 10 is a diagram showing a primary portion of another example circuit structure of a three-dimensional measurement sensor.

FIG. 10 shows another circuit structure. In FIG. 10, elements corresponding to those shown in FIG. 9 are assigned the same reference numerals and will not be described again.

In the circuit structure of FIG. 9, the signal of each signal line 12 is digitized by the A/D converter 60 and compared by the comparator 64. In the circuit structure of FIG. 10, the comparison is executed in analog. The structure will now be described in detail.

A signal flowing in the signal line 12 is input to a comparator 72 and a latch 70. The comparator 72 compares a signal in the signal line 12 and a signal supplied from the latch 70. When a result of the comparison shows that the former is larger than the latter, the comparator 72 outputs an H level signal. When, on the other hand, the former is smaller than the latter, the comparator 72 outputs an L level signal. The latch 70 holds a signal supplied from the signal line at that point of time when the H level signal is input from the comparator 72. Such a latch 70 can be formed as a sampling and holding circuit, and the output of the comparator 72 forms a trigger signal to instruct the sampling operation with respect to the sampling and holding circuit. When, on the other hand, the L level signal is input from the comparator 72, the latch 70 continues to hold the signal level stored in the latch 70, and supplies the held signal to the comparator 72. The latch 70 is reset after the completion of one horizontal scan period, and before the start of the next horizontal scan period.

With such a circuit structure also, it is possible to supply, from the comparator 72 to the data memory 66, a signal similar to the output of the comparator 64 in the circuit structure of FIG. 9. Therefore, similar to FIG. 9, at the completion of one horizontal scan period, each data memory 66 stores a count value corresponding to the incidence position of the slit light on the corresponding signal line 12. The processes that follow may be similar to those in the structure of FIG. 3. Thus, with this circuit structure also, information of the three-dimensional shape can be determined in a manner similar to those of the structures of FIGS. 3, 7, 8, and 9.

As described, according to the embodiments of the present invention, it is possible to provide a three-dimensional shape measurement sensor which can obtain data similar to those in Non-Patent Document 2 and Patent Document 1, with a circuit structure simpler than the circuit structure of these documents, and to provide a measurement device which uses the three-dimensional shape measurement sensor.

The invention claimed is:

1. A three-dimensional measurement sensor which obtains information for calculation of a three-dimensional shape through a light-sectioning method, the sensor comprising:
    a light detector array in which light detectors are placed in a matrix form;
    a row signal line which is provided for each row of the light detector array and which is connected to an output of each light detector belonging to a corresponding row;
    a row scan circuit which selects light detectors of the light detector array in units of columns, causes output of an output signal of each selected light detector to a corresponding row signal line, and sequentially switches a column to be selected from one end of the row to another end of the row during a row scan period which is sufficiently short such that an image of slit light which is scanned for the light-sectioning method on the light detector array can be assumed to be substantially stationary;
    a light reception position detector circuit which is provided for each row signal line, which detects, for each row scan period, a peak of a signal flowing through a corresponding row signal line in the row scan period, and which determines information of a light reception position on the row of the light detector array in the row scan period on the basis of a timing of detection of the peak; and
    an output circuit which outputs the information of the light reception position determined by each light reception position detector circuit for each row scan period.

2. The three-dimensional measurement sensor according to claim 1, further comprising:
    a counter which counts a clock signal which is an operation reference of the row scan circuit, wherein
    each light reception position detector circuit outputs a count value of the counter at the timing of detection of the peak as the information of the light reception position.

3. The three-dimensional measurement sensor according to claim 1, further comprising:
    a counter which counts a clock signal which is an operation reference of the row scan circuit; and
    a lookup table which stores information of light reception positions corresponding to count values of the counter, wherein
    each light reception position detector circuit reads information of a light reception position corresponding to the count value of the counter from the lookup table and outputs the information.

4. The three-dimensional measurement sensor according to claim 1, wherein
    each light reception position detector circuit generates, as the information of the light reception position, a signal having a signal level corresponding to the light reception position based on a timing of detection of the peak.

5. The three-dimensional measurement sensor according to claim 4, wherein
  each light reception position detector circuit comprises:
  a peak-holding circuit which holds a peak level of a signal on a corresponding one of the row signal lines;
  a differentiating circuit which differentiates an output of the peak-holding circuit;
  an integrating circuit which integrates a predetermined reference signal; and
  a control element which causes discharging of charges stored in the integrating circuit when an output of the differentiating circuit assumes an ON level and causes storage of charges in the integrating circuit when the output of the differentiating circuit is at the OFF level, and
  the output circuit outputs an output of the integrating circuit at a completion of the row scan period as the information of the light reception position.

6. The three-dimensional measurement sensor according to claim 4, wherein
  the light reception position detector circuit comprises:
  a peak-holding circuit which holds a peak level of a signal on a corresponding one of the row signal lines;
  a differentiating circuit which differentiates an output of the peak-holding circuit;
  a light reception position signal generation circuit which generates a light reception position signal having a signal level corresponding to an elapsed time from a start of the row scan period; and
  a sampling and holding circuit which is triggered by an output of the differentiating circuit and which samples and holds the light reception position signal at the time of the trigger, and
  the output circuit outputs a signal held by the sampling and holding circuit at a completion of the row scan period as the information of the light reception position.

7. The three-dimensional measurement sensor according to claim 1, further comprising:
  an angle counter which determines a projection angle of slit light with respect to a measurement target; and
  a storage processor which stores the information of the light reception position determined by each light reception position detector circuit in the row scan period in correspondence to a count value of the angle counter for the row scan period.

8. The three-dimensional measurement sensor according to claim 5, further comprising:
  an angle counter which determines a projection angle of slit angle with respect to a measurement target; and
  a storage processor which stores the information of the light reception position determined by each light reception position detector circuit in the row scan period and an output of the peak-holding circuit at the completion of the row scan period, in correspondence to a count value of the angle counter for the row scan period.

9. The three-dimensional measurement sensor according to claim 6, further comprising:
  an angle counter which determines a projection angle of slit angle with respect to a measurement target; and
  a storage processor which stores the information of the light reception position determined by each light reception position detector circuit in the row scan period and an output of the peak-holding circuit at the completion of the row scan period, in correspondence to a count value of the angle counter for the row scan period.

* * * * *